United States Patent [19]

Flatau et al.

[11] 3,966,695

[45] June 29, 1976

[54] PREVENTION OF WALL DEPOSITS DURING POLYVINYL CHLORIDE POLYMERIZATIONS

[75] Inventors: Karsten Flatau; Bernd Terwiesch, both of Marl, Germany

[73] Assignee: Chemische Werke Huls Aktiengesellschaft, Marl, Germany

[22] Filed: Feb. 6, 1975

[21] Appl. No.: 547,608

[30] Foreign Application Priority Data

Feb. 8, 1974 Germany............................ 2405978

[52] U.S. Cl.................................. 526/62; 526/344; 526/345; 526/200; 526/227
[51] Int. Cl.².................... C08F 2/16; C08F 14/06
[58] Field of Search .............................. 260/92.8 W

[56] References Cited
UNITED STATES PATENTS

| | | | |
|---|---|---|---|
| 3,515,709 | 6/1970 | Nelson et al.................. | 260/92.8 W |
| 3,778,423 | 12/1973 | Reiter............................ | 260/92.8 W |
| 3,842,055 | 10/1974 | Gabriel et al.................. | 260/92.8 W |
| 3,849,179 | 11/1974 | Morningstar................... | 260/92.8 W |

FOREIGN PATENTS OR APPLICATIONS

| | | | |
|---|---|---|---|
| 45-30343 | 1/1970 | Japan............................ | 260/92.8 W |

OTHER PUBLICATIONS

B415,124, Jan. 1975, Burgess et al., 260/92.8 W.

*Primary Examiner*—Alan Roller
*Attorney, Agent, or Firm*—Millen, Raptes & White

[57] ABSTRACT

The formation of polymer on the surfaces of the reactor equipment in the commercial production of polyvinyl chloride and copolymers thereof is avoided by employing equipment whose surfaces which contact the monomer are formed of substantially pure nickel.

14 Claims, No Drawings

PREVENTION OF WALL DEPOSITS DURING POLYVINYL CHLORIDE POLYMERIZATIONS

BACKGROUND OF THE INVENTION

The production of polyvinyl chloride by emulsion, suspension and homogenization polymerization in the aqueous phase is well-known. Likewise conventional is the array of problems encountered with respect to wall deposits in conducting these processes on a commercial scale. Coatings of polyvinyl chloride are formed as paper-like layers or crusts on the inner wall of the reactor and on the units installed within the reactor. As is known, this formation of coatings and crusts not only reduces the polymer yield and the cooling capacity of the polymerization reactor, but also impairs the product quality, since the flakes of polymer become detached from the reactor walls and mix with the product. Therefore, it is necessary to open and clean the reactor after each polymerization cycle or after only a few polymerization cycles. Due to the time-consuming and difficult removal of the polymer coating from the reactor walls, which requires a great amount of work, the capacity of a polymerization reactor is reduced and a continuous polymerization is impossible.

Many attempts have been made to prevent such polymer deposit formations on the reactor walls. However, a satisfactory solution of the problem has not been attained heretofore.

It is known that alkaline-reacting compounds can be added to a polymerization system to reduce the deposition of flakes of polymer on the walls of the reactor [German Unexamined Laid-Open Application] DOS 2,208,796. According to DOS 1,745,391, to decrease the polymer deposits, the polymerization of vinyl chloride is carried out in the presence of a dispersing agent, a nonionic wetting agent and an inert solvent in an aqueous medium which is maintained alkaline. According to these teachings, an alkaline pH value must be strictly adhered to, if cakings are to be reduced.

DOS 2,044,259 describes, as a measure for preventing the formation of coatings, the application of at least one polar organic compound and/or at least one organic dye and/or at least one inorganic pigment as such or in a dissolved and/or diluted form to the surface of the internal walls of the reactor, to the agitator vanes, the baffles, the cooler and the conduits connecting the cooler with the polymerization reactor. A further reduction of the formation of polymer deposits is attained by adding to the polymerization charge a quantity of an alkali or alkaline earth hydroxide or oxide of such a quantity that the pH of the charge, after the polymerization has been completed, is at least 6, preferably at least 8. If the walls of the polymerization reactor are metal, a further improved effect is attained by adding an organic oxide to the mother liquor. If, in the aforementiond process, an oxidizing agent is also added to the aqueous phase prior to polymerization, the effectiveness of the above-mentioned oxides is enhanced.

According to DOS 2,212,962, the formation of deposits is prevented by the use of rapidly acting catalysts while maintaining an acidic pH value and operating with a comparatively cool reactor wall. Although the hydrogen chloride produced during the polymerization is not neutralized in this procedure, the reduction in polymerization velocity, which occurs in the case of a more strongly alkaline medium, is avoided and the graft polymerization of the monomers to the protective colloid, considered an absolute necessity in this method, is not suppressed.

According to DOS 1,645,397, a reduction in the deposit formation can be achieved by homogenizing the aqueous dispersion which contains protective colloids, polymerizing the charge under agitation, stopping the agitation at a specific conversion, and later on continuing the process again under agitation.

The measures as taken above, such as the addition of special compounds to the polymerization charge, new polymerization recipes, preparing the inner surfaces of the reactor with dyes, as well as methods of process technology, e.g., as in DOS 1,645,397, by interruption of agitation, are expensive and/or of only limited usefulness and do not prevent the final deposition of flakes of polymer, after all, on the inner walls of the reactor when several polymerization cycles have gone by. The great number of the above-described methods, however, demonstrates that a universally usable process or a generally applicable regimen for substantially suppressing or for entirely eliminating the formation of polymer deposits on the inner walls of reactors during the suspension polymerization of vinyl chloride does not exist.

The specific processes and measures described in the literature do not have a uniformly positive effect during the manufacture of various types of polyvinyl chloride produced by the suspension polymerization to be used in different applications. The measure of making the polymerization formulations more complicated is unsatisfactory. Treatment of the reactor walls and/or units disposed therein produces the risk that the properties of the product will be adversely altered by the addition and/or application of, for example, dyes. Furthermore, the coating of inner reactor walls is expensive, especially since such coating step must be repeated afer a few batches, and disadvantages are encountered from a safety viewpoint, if the aforementioned substances must be applied within the polymerization vessel as such or dissolved in a small amount of alcohol or benzene.

Therefore, it is an object of this invention to avoid the above-discussed disadvantages of the prior art and make available a polymerization process and apparatus which is equipped so that any desired polymerization recipe can be utilized without limitation. It is another object to provide a polymerization process and apparatus in which the deposit of polymer flakes on the walls of the apparatus is avoided even during a continuous operation. Other objects will be apparent to those skilled in the art.

SUMMARY OF THE INVENTION

According to this invention, the polymerization of vinyl chloride and mixtures thereof with copolymerizable monomers in an aqueous dispersion is conducted in a polymerization apparatus whose surfaces which come into contact with the vinyl monomers, e.g., the inner wall surfaces of agitator-equipped pressure autoclave and of installations and coolers in and on the autoclaves, are formed of substantially pure nickel, having a purity of at least 99%, preferably at least 99.6%.

DETAILED DISCUSSION

It is known from Japanese Application 4 849 876 (referenced in CPI, 1973, week 42) that only a small amount of polymer is deposited on Ni-Cu alloys containing 10–80% nickel. However, this literature reference does not disclose that the use of nickel alone, as the wall material, suppresses the deposit formation to a substantially higher degree, i.e., practically completely.

In a preferred embodiment of the invention, the inner wall surfaces of the reactors and of the installations and coolers present in and on the autoclave are galvanically nickel-plated.

It is also advantageous to deposit the nickel layers from a nickel salt solution without the use of current, by the action of reducing agents, such as sodium borohydride, borozanes (NIBODUR process) or hypophosphite in an acidic or alkaline medium (KANIGEN process). (See"Römpp-Chemielexikon", 6th ed., Stuttgart, 1966, pp. 4356 and 3152). In another specific embodiment of this invention, the surfaces of the inner walls of a stainless steel polymerization autoclave and installations and coolers present in and on the autoclave are plated with a nickel coating. The nickel layers applied to the stainless steel preferably have a thickness of about 10–80 $\mu$. It is also possible to employ an agitated autoclave and installations therein which consist totally of pure nickel.

A particular advantage of this invention is that, in place of a large number of different measures which must be adapted to individual polymerization recipes and can be difficult in their technical conductance, the single, universally applicable measure of the use of polymerization reactors having internal surfaces of nickel only leads to the result that the vinyl chloride (co-) polymerization can be accomplished in the aqueous phase without the formation of polymer flakes.

The agitator-equipped pressure autoclaves to be utilized according to this invention can be produced from V2A [18% Cr, 8% Ni] or V4A [18% Cr, 8% Ni, 2% Mo] steel or other stainless steels customarily employed in apparatus construction. According to the invention, the inner surfaces of these autoclaves and the surfaces of their installations, such as agitator vanes, baffles, reflux condensers, and the conduits connecting the reflux condenser with the autoclave, are made of substantially pure nickel, i.e., containing at most only trace impurities. The application of pure nickel layers to the stainless steel surfaces can be accomplished by plating, such as roll-plating or weld-plating. Technically pure nickel is employed for this purpose, as described in "Ullmanns Encyklopaedie der technischen Chemie," 4th ed., Vol. 3, p. 21 under 3.1.2, preferably the types W No. 2.4060, and LC nickel. However, chemical or galvanic (electrochemical) processes are also possible. A description of these processes is found in "Ullmanns Encyklopaedie der technischen Chemie", 4th ed., Vol. 3, p. 26 under 3.1.3.

Preferably, the processes will be used which operate without external current, wherein the pure nickel is precipitated from a nickel salt solution with the aid of reducing agents (NIBODUR and/or KANIGEN process).

The pure nickel layers are applied to the stainless steel to a thickness of 10–80 $\mu$. The stainless steel can be pretreated by polishing, such as manual burnishing, industrial polishing or electropolishing, and the applied pure nickel layer can be aftertreated by the aforementioned polishing methods.

The suspension polymerization of vinyl chloride or of a mixture of vinyl monomers with a vinyl chloride content of at least 50% can be accomplished in accordance with the usual processes in the aqueous phase in the presence of suspension agents and oil-soluble catalysts. Any desired conventional suspension agent can be utilized, such as polyvinyl alcohol, polyvinyl acetate, partially saponified polyvinyl acetate, vinyl acetate - maleic anhydride copolymers, styrene - maleic anhydride copolymers, polyacrylic acid, gelatin, starch or cellulose derivatives, e.g., methyl-, hydroxymethyl- or carboxymethylcellulose, or solid dispersing agents, such as calcium carbonate, magnesium carbonate, barium sulfate, titanium white ($TiO_2$), or aluminum oxide, which are used optionally by themselves or as a mixture of two or more suspension agents.

The suspension stabilizers can be combined additionally with neutral or ionic tensides to improve their dispersion power.

Suitable catalysts are organic peroxides, e.g., lauroyl, benzoyl, 2,4-dichlorobenzoyl, or methylcyclohexylsulfonyl peroxide, tert.-butyl peroxypivalate, diisopropyl peroxydicarbonate, and the like, and azo compounds, e.g., $\alpha,\alpha'$-azobisisobutyronitrile, $\alpha,\alpha'$-azobis-2,4-dimethylvaleronitrile and the like, by themselves or as a mixture of two or more catalysts.

The polymerization temperature is suitably 30°–80° C., and the reaction pressure corresponds to the usual conditions during the suspension polymerization of vinyl chloride. According to this invention, the monomer or monomers can be present entirely in the initial charge of the reactor, or the monomer or monomers can be added to the reaction mixture during the polymerization.

The emulsion polymerization of vinyl chloride or of a mixture of vinyl monomers with a vinyl chloride content of at least 50% is conducted, as in the conventional processes, in the aqueous phase and in the presence of tensides and water-soluble or oil-soluble catalysts. Suitable emulsifiers for the mode of operation according to the invention are alkali sulfates of long-chain fatty alcohols, alkali salts or alkyl- or alkylarylsulfonates, and soaps of fatty acids and/or ammonium salts of the aforementioned compounds; furthermore, alkali metal or ammonium salts of alkylsulfosuccinic acids. The emulsifiers can be used individually or as a mixture of two or more emulsifiers, wherein the latter are present entirely or partially in the reaction vessel at the beginning of the polymerization reaction or can also be added to the reaction mixture during the polymerization.

Suitable polymerization initiators are water-soluble catalysts, such as, for example, persulfates, or oil-soluble catalysts, such as azo compounds, e.g., azobisisobutyronitrile, and/or peroxides, such as lauroyl peroxide, benzoyl peroxide, acetylcyclohexylsulfonyl peroxide, isopropyl peroxydicarbonate, and the like, alone or as a mixture of two or more catalysts. Moreover, water-soluble reducing agents customary for redox systems can be added to the system containing the oil-soluble or water-soluble catalysts.

It is also possible to precede the polymerization by a mechanical homogenizing step, thus obtaining a stable dispersion with minimally small droplets.

The polymerization reaction can be accomplished at any temperature, with the range from 0° to 100° C. being customary and the range from 50° to 80° C. being preferred. The reaction pressure corresponds to the usual conditions for the emulsion polymerization or copolymerization of vinyl chloride.

Without further elaboration, it is believed that one skilled in the art can, using the preceding description, utilize the present invention to its fullest extent. The following preferred specific embodiments are therefore to be construed as merely illustrative and not limitative of the remainder of the disclosure in any way whatsoever.

EXAMPLE 1

A stainless steel autoclave of conventional structure (as disclosed e.g. in U.S. Pat. No. 3,785,430) and the composition or surface characteristics shown in the table below is fed with 2500 parts of desalted water, 72 parts of a 2% aqueous solution of methylhydroxypropylcellulose and 1.5 parts of dilauroyl peroxide. After evacuation, the autoclave is charged with 1500 parts of vinyl chloride and the polymerization is conducted at 64° C. up to a conversion of 90%. Various test elements are installed within the autoclave on which the wall deposits formed during the polymerization can be accurately determined. The gravimetric determination of the polymer deposits is carried out after a cycle of 5 polymerization batches and yields the results compiled in the table as average values of a number of different determinations. (The parts mean parts by weight in each case).

TABLE

Gravimetric Determination of the Wall Deposits

| Test Element Made of | Polymer Deposit in g./100 cm$^2$ Test Element Surface Area |
|---|---|
| A. V4A Steel, untreated | 0.35 |
| B. V4A Steel, industrially polished | 0.22 |
| C. V4A Steel, hand-polished | 0.18 |
| D. V4A Steel, electropolished | 0.10 |
| E. V4A Steel, coated with a nickel phthalocyanine | 0.15 |
| F. V4A Steel, coated with an azo dye | 0.15 |
| G. V4A Steel, copper-plated | 0.36 |
| H. V4A Steel, chrome-plated | 0.18 |
| I. Nickel-copper alloy, 30% Ni | 0.96 |
| J. Nickel-copper alloy, 70% Ni | 0.30 |
| 1. V4A Steel, nickel-plated by electrodeposition | 0.00 |
| 2. Nickel, untreated | 0.00 |

EXAMPLE 2

The vinyl chloride suspension polymerization is conducted in the same way as in Example 1 in a stainless steel autoclave, the inner surfaces of which are nickel-plated by electrodeposition. After a cycle of 5 polymerization batches, all nickel surfaces in the interior of the reactor are free of polymer. The walls have a metallic gloss.

COMPARATIVE EXAMPLE

The vinyl chloride suspension polymerization is carried out as described in Example 1 in a stainless steel autoclave, the walls and auxiliary devices of which consist of an industrially polished V4A steel. After a cycle of 5 polymerization batches, a paper-like polymer coat has been deposited on all interior metallic surfaces of the vessel. The walls no longer have a metallic luster.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the commercial production of polyvinyl chloride and copolymers wherein vinyl chloride or a mixture of vinyl chloride and one or more vinyl monomers copolymerizable therewith is polymerized in an aqueous phase in a polymerization zone comprising metallic surfaces which are contacted by the vinyl chloride or mixture of monomers, the improvement wherein the metallic surfaces are substantially pure nickel having a purity of at least 99.0%.

2. A suspension polymerization according to claim 1.

3. A polymerization according to claim 1 wherein vinyl chloride is homopolymerized.

4. A suspension polymerization according to claim 3.

5. A method of reducing substantially the ratio of build-up of polymer on the surfaces of a steel reactor and associated apparatus adapted for the polymerization in an aqueous phase of vinyl chloride or a mixture of vinyl chloride and one or more vinyl monomers copolymerizable therewith which comprises coating the surfaces of the reactor which are contacted by the vinyl chloride or mixtures of monomers prior to the polymerization with a layer of substantially pure nickel.

6. A method according to claim 5 wherein the nickel is plated on the surfaces electrochemically.

7. A method according to claim 5 wherein the nickel is deposited on the surfaces from a nickel salt solution by the addition of a reducing agent thereto.

8. A method according to claim 5 wherein the layer of nickel is 10 – 80 μ thick.

9. A method according to claim 5 wherein said nickel surfaces are formed by nickel-plating the steel surfaces electrochemically.

10. A method according to claim 5 wherein said nickel surfaces are formed by depositing nickel from an aqueous nickel salt solution with a reducing agent.

11. A method according to claim 10 wherein the reducing agent is sodium borohydride or a borazane.

12. A method according to claim 5 wherein the nickel surfaces are formed by depositing the nickel on the steel surfaces from a nickel salt solution with a phosphite reducing agent.

13. A polymerization according to claim 1 wherein the metallic surfaces are nickel having a purity of at least 99.6%.

14. A polymerization according to claim 13 wherein vinyl chloride is homopolymerized by suspension polymerization.

* * * * *